(12) United States Patent
Jang et al.

(10) Patent No.: US 8,354,592 B2
(45) Date of Patent: Jan. 15, 2013

(54) SUPER-CONDUCTING CABLE DEVICE

(75) Inventors: Seok Hern Jang, Gunpo-si (KR); Su Kil Lee, Gumi-si (KR); Hyun Man Jang, Hwaseong-si (KR); Chang Youl Choi, Gumi-si (KR); Keun Tae Lee, Gumi-si (KR); Yang Hoon Kim, Jeonju-si (KR); Seok Ju Lee, Masan-si (KR)

(73) Assignee: LS Cable Ltd., Anyangsi, Gyeonggi-do (KR)

( * ) Notice: Subject to any disclaimer, the term of this patent is extended or adjusted under 35 U.S.C. 154(b) by 0 days.

(21) Appl. No.: 13/218,936

(22) Filed: Aug. 26, 2011

(65) Prior Publication Data

US 2012/0276770 A1  Nov. 1, 2012

(30) Foreign Application Priority Data

Apr. 27, 2011  (KR) .................. 10-2011-0039265

(51) Int. Cl.
*H01B 12/00* (2006.01)

(52) U.S. Cl. ............... 174/125.1; 174/15.5; 439/196; 505/230

(58) Field of Classification Search ............... 174/125.1, 174/15.4, 15.5; 439/196; 505/230
See application file for complete search history.

(56) References Cited

U.S. PATENT DOCUMENTS

| | | | | |
|---|---|---|---|---|
| 3,895,432 A * | 7/1975 | Diepers et al. | ........... | 29/599 |
| 4,485,266 A * | 11/1984 | Minati et al. | ........... | 174/15.4 |
| 4,794,688 A * | 1/1989 | Wada et al. | ........... | 29/599 |
| 5,859,386 A * | 1/1999 | Herrmann et al. | ........... | 174/15.5 |
| 6,112,531 A * | 9/2000 | Yamaguchi | ........... | 62/51.1 |
| 6,583,351 B1 * | 6/2003 | Artman | ........... | 174/15.5 |
| 7,067,739 B2 * | 6/2006 | Ashibe et al. | ........... | 174/84 R |
| 7,094,973 B2 * | 8/2006 | Ashibe et al. | ........... | 174/125.1 |
| 7,102,083 B2 * | 9/2006 | Jang | ........... | 174/125.1 |
| 7,148,423 B2 * | 12/2006 | Masuda et al. | ........... | 174/125.1 |
| 7,151,225 B2 * | 12/2006 | Fujikami | ........... | 174/125.1 |
| 7,166,804 B2 * | 1/2007 | Yumura et al. | ........... | 174/125.1 |
| 7,211,723 B2 * | 5/2007 | Hirose et | ........... | 174/15.5 |
| 7,265,297 B2 * | 9/2007 | Ashibe et al. | ........... | 174/125.1 |
| 7,279,639 B2 * | 10/2007 | Ashibe et al. | ........... | 174/125.1 |
| 7,332,671 B2 * | 2/2008 | Mirebeau et al. | ........... | 174/15.5 |
| 7,371,968 B1 * | 5/2008 | Hennessy | ........... | 174/125.1 |
| 7,439,448 B2 * | 10/2008 | Masuda et al. | ........... | 174/125.1 |
| 7,498,519 B2 * | 3/2009 | Ashibe et al. | ........... | 174/125.1 |
| 7,547,846 B2 * | 6/2009 | Lallouet et al. | ........... | 174/84 R |
| 7,605,329 B2 * | 10/2009 | Schmidt et al. | ........... | 174/15.4 |
| 7,708,577 B2 * | 5/2010 | Lallouet et al. | ........... | 439/190 |
| 7,723,611 B2 * | 5/2010 | Stagi et al. | ........... | 174/15.1 |
| 7,729,731 B2 * | 6/2010 | Ashibe et al. | ........... | 505/220 |
| 7,953,304 B2 * | 5/2011 | Jang et al. | ........... | 385/12 |
| 7,999,182 B2 * | 8/2011 | Lallouet et al. | ........... | 174/88 R |
| RE42,819 E * | 10/2011 | Lallouet et al. | ........... | 174/84 R |

(Continued)

*Primary Examiner* — Ross Gushi
(74) *Attorney, Agent, or Firm* — Lowe Hauptman Ham & Berner, LLP

(57) ABSTRACT

Provided is a superconducting cable device including: a first superconducting cable and a second superconducting cable; an intermediate connection box which connects the first and second superconducting cables to each other; and a cooling device which causes a coolant to flow inside the intermediate connection box in a lengthwise direction of the intermediate connection box, wherein a cable connection portion for connecting the first and second superconducting cables to each other is provided in the intermediate connection box. In an uncooled state, the cable connection portion is disposed to be eccentric from a center line in the lengthwise direction of the intermediate connection box in a direction in which the coolant flows.

8 Claims, 3 Drawing Sheets

U.S. PATENT DOCUMENTS

| | | | |
|---|---|---|---|
| 8,037,705 B2 * | 10/2011 | Schmidt et al. | 62/259.2 |
| 8,271,061 B2 * | 9/2012 | Lallouet | 505/220 |
| 8,280,467 B2 * | 10/2012 | Yuan et al. | 505/163 |
| 2004/0256141 A1 * | 12/2004 | Fujikami | 174/125.1 |
| 2004/0256144 A1 * | 12/2004 | Masuda et al. | 174/125.1 |
| 2005/0067184 A1 * | 3/2005 | Jang | 174/125.1 |
| 2005/0217878 A1 * | 10/2005 | Ashibe et al. | 174/15.5 |
| 2006/0283620 A1 * | 12/2006 | Maguire et al. | 174/125.1 |
| 2007/0169957 A1 * | 7/2007 | Ashibe et al. | 174/125.1 |
| 2007/0284130 A1 * | 12/2007 | Lallouet et al. | 174/84 S |
| 2008/0110659 A1 * | 5/2008 | Ashibe | 174/15.5 |
| 2009/0192042 A1 * | 7/2009 | Kim et al. | 505/230 |
| 2009/0264296 A1 * | 10/2009 | Lallouet | 505/220 |
| 2010/0087101 A1 * | 4/2010 | Lallouet et al. | 439/732 |
| 2010/0087322 A1 * | 4/2010 | Yuan et al. | 505/163 |
| 2010/0184604 A1 * | 7/2010 | Roden et al. | 505/237 |
| 2010/0190649 A1 * | 7/2010 | Doll et al. | 505/220 |
| 2010/0199689 A1 * | 8/2010 | Choi et al. | 62/51.1 |
| 2010/0285968 A1 * | 11/2010 | Gregory | 505/300 |
| 2010/0298149 A1 * | 11/2010 | Kim et al. | 505/231 |
| 2011/0045987 A1 * | 2/2011 | Jang et al. | 505/163 |
| 2011/0174535 A1 * | 7/2011 | Sung et al. | 174/84 R |
| 2011/0203829 A1 * | 8/2011 | Jang et al. | 174/102 R |
| 2011/0207611 A1 * | 8/2011 | Jang et al. | 505/163 |
| 2012/0061139 A1 * | 3/2012 | Bianchetti et al. | 174/75 R |
| 2012/0118600 A1 * | 5/2012 | Choi et al. | 174/15.5 |
| 2012/0186854 A1 * | 7/2012 | Choi et al. | 174/22 R |
| 2012/0214672 A1 * | 8/2012 | Choi et al. | 505/163 |
| 2012/0245033 A1 * | 9/2012 | Lee et al. | 505/220 |

* cited by examiner

SUPER-CONDUCTING CABLE DEVICE

CROSS-REFERENCE TO RELATED APPLICATION

This application claims priority to Korean Patent Application No. 10-2011-0039265, filed on Apr. 27, 2011, and all the benefits accruing therefrom under 35 U.S.C. §119, the contents of which in its entirety are herein incorporated by reference.

BACKGROUND

1. Field

This disclosure relates to a superconducting cable device, and more particularly, to a superconducting cable device which is lengthened by connecting a plurality of superconducting cables.

2. Description of the Related Art

In order to maximize an electricity transmission efficiency, a superconducting cable of which the electrical resistance is very low has been developed. The superconducting cable generally includes a cable core made of a superconducting wire of which the electrical resistance is close to 0, and a double heat-insulating pipe which covers the cable core. In order to maintain the cable core which is the superconducting wire in a cooled state at its critical temperature or below, the superconducting cable has a special heat-insulating structure.

Recently, for commercialization of the superconducting cable, an effort to connect a plurality of superconducting cables so as to be lengthened has been made.

To lengthen the superconducting cable, an intermediate connection box capable of connecting the superconducting cables is used. The intermediate connection box functions as a fixed point of the superconducting cables, and inside the intermediate connection box, the superconducting cables are connected.

In order to connect the superconducting cables to each other, the cable cores of the superconducting cables that extend to the inside of the intermediate connection box are fixed to each other by soldering. In order to firmly maintain the fixed state of the connected cable cores, the connected cable cores are taped and fixed using insulating paper for superconducting cables such as polypropylene laminated paper (PPLP). Accordingly, a thick cable connection portion is formed inside the intermediate connection box.

In order to ensure the performance of the superconducting cable device which is lengthened, the position of the cable connection portion inside the intermediate connection box needs to be optimized. If the position of the cable connection portion is not optimized, for example, insulation breakdown of the cable connection portion may occur due to heat that locally invades the intermediate connection box. In addition, as the position of the cable connection portion is moved due to heat shrinkage of the superconducting cable during a cooling process, the cable connection portion comes in contact with an inner box of the intermediate connection box and is damaged.

SUMMARY

This disclosure provides a superconducting cable device which is lengthened and in which the position of a cable connection portion is optimized in an intermediate connection box.

In one aspect, there is provided a superconducting cable device including: a first superconducting cable and a second superconducting cable; an intermediate connection box which connects the first and second superconducting cables to each other; and a cooling device which causes a coolant to flow inside the intermediate connection box in a lengthwise direction of the intermediate connection box, wherein a cable connection portion for connecting the first and second superconducting cables to each other is provided in the intermediate connection box. In an uncooled state, the cable connection is disposed to be eccentric from a center line in the lengthwise direction of the intermediate connection box in a direction in which the coolant flows.

In a cooled state, a high-temperature region is formed at both end portions inside the intermediate connection box due to heat that invades the intermediate connection box, a low-temperature region which has a temperature lower than that of the high-temperature region is formed at a center portion inside the intermediate connection box, and a position of the cable connection portion is adjusted to the low-temperature region inside the intermediate connection box.

According to an embodiment, in the cooled state, a center of the cable connection portion may be positioned at the center line in the lengthwise direction of the intermediate connection box.

The superconducting cable device may further include: a first terminal connection box which is connected to the first superconducting cable; and a second terminal connection box which is connected to the second superconducting cable. A coolant inlet through which the coolant is injected is provided in the first terminal connection box, and a coolant outlet through which the coolant flows out is provided in the second terminal connection box. The coolant injected through the coolant inlet flows into the intermediate connection box through the first superconducting cable, and the coolant that flows out from the intermediate connection box passes through the second superconducting cable and flows out through the coolant outlet.

A distance by which the cable connection portion is eccentric from the center line in the lengthwise direction of the intermediate connection box in the uncooled state may be determined by a heat shrinkage rate of the first superconducting cable. According to an embodiment, the distance by which the center of the cable connection portion is eccentric from the center line in the lengthwise direction of the intermediate connection box in the uncooled state is 0.2 to 0.5% of a distance from the coolant inlet of the first terminal connection box to the center line in the lengthwise direction of the intermediate connection box.

The first and second superconducting cables may each include a cable core and a heat-insulating pipe that covers the cable core, the heat-insulating pipes of the first and second superconducting cables may respectively be connected to both end portions of the intermediate connection box, the respective cable cores of the first and second superconducting cables may extend to the inside of the intermediate connection box and may be connected to each other, and the respective heat-insulating pipes of the first and second superconducting cables may be joined to the intermediate connection box through expansion joints.

The intermediate connection box may include a moving unit so as to enable position adjustment of the intermediate connection box.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
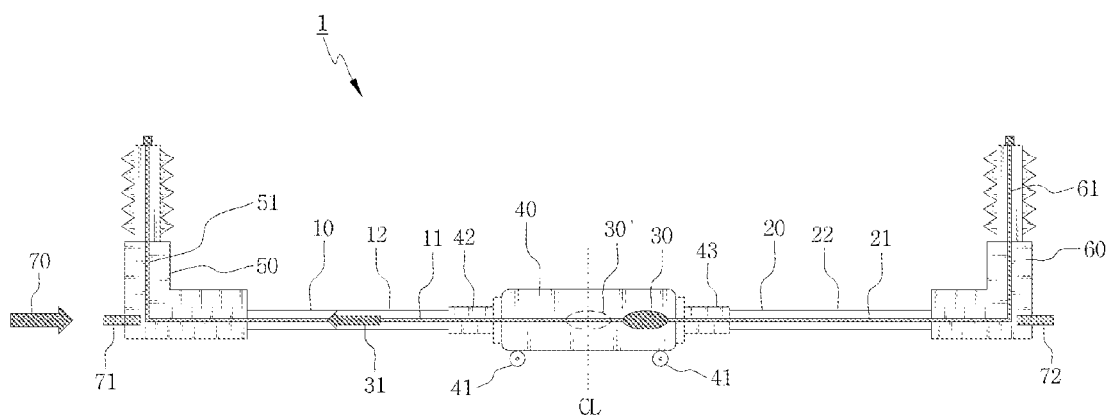
FIG. 1 is a conceptual view of a superconducting cable device according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

FIG. 1 is a conceptual view of a superconducting cable device 1 according to an embodiment.

As illustrated in FIG. 1, the superconducting cable device 1 according to this embodiment includes a first superconducting cable 10, a second superconducting cable 20, and an intermediate connection box 40 which connects the first and second superconducting cables 10 and 20 to each other. The first superconducting cable 10 includes a cable core 11 made of a superconducting wire and a heat-insulating pipe 12 that covers the cable core 11.

The heat-insulating pipe 12 of the first superconducting cable 10 is connected to one end portion of the intermediate connection box 40. At a connection portion of the first superconducting cable 10 and the intermediate connection box 40, a bellows 42 is provided as an expansion joint. The bellows 42 is a member that is able to contract and expand, and has a function of cancelling a force of pulling the intermediate connection box 40 in a shrinkage direction as the heat-insulating pipe 12 of the first superconducting cable 10 undergoes heat shrinkage.

The other end portion of the first superconducting cable 10 is connected to a first terminal connection box 50. Since the configuration of a terminal connection box which is connected to a terminal of a superconducting cable and functions as a terminal of an electrical signal is well known, detailed description thereof will be omitted. The first terminal connection box 50 is provided with a coolant inlet 71 through which a cryogenic coolant 70 flows in. In this embodiment, liquid nitrogen is used as the coolant 70.

The second superconducting cable 20 includes a cable core 21 made of a superconducting wire and a heat-insulating pipe 22 that covers the cable core 21.

The heat-insulating pipe 22 of the second superconducting cable 20 is connected to one end of the intermediate connection box 40. At a connection portion of the second superconducting cable 20 and the intermediate connection box 40, a bellows 43 is also provided.

The other end portion of the second superconducting cable 20 is connected to a second terminal connection box 60. The second terminal connection box 60 is provided with a coolant outlet 72 through which the coolant 70 that passes through the second superconducting cable 20 flows out.

The respective cable cores 11 and 21 of the first and second superconducting cables 10 and 20 extend to the inside of the intermediate connection box 40 and are connected to each other.

At a portion where the respective cable cores 11 and 21 of the first and second superconducting cables 10 and 20 are connected to each other, a cable connection portion 30 having a thickness of several times those of the cable cores 11 and 21 is formed.

In addition, the cable cores 11 and 21 of the first and second superconducting cables 10 and 20 are connected to terminal cable cores 51 and 61 formed inside the first and second terminal connection boxes 50 and 60, respectively.

The superconducting cable device 1 according to this embodiment includes a cooling device (not shown) for cooling the device.

The cryogenic coolant 70 is injected through the coolant inlet 71 by the cooling device. The injected coolant 70 flows into the heat-insulating pipe 12 of the first superconducting cable 10. The coolant 70 that flows into the first superconducting cable 10 passes through the intermediate connection box 40 and flows into the heat-insulating pipe 22 of the second superconducting cable 20. The coolant 70 that flows into the second superconducting cable 20 flows into the second terminal connection box 60 and flows out of the device through the coolant outlet 72. The cooling device may include a coolant circulation system which re-cools the coolant 70 that flows out through the coolant outlet 72 and injects it through the coolant inlet 71 again.

According to this embodiment, the coolant 70 flows inside the intermediate pull box 40 along the lengthwise direction of the intermediate connection box 40 from the first superconducting cable 10 to the second superconducting cable 20 and cools the inside of the intermediate connection box 40.

Reference numeral 31 that is not described in FIG. 1 represents a heat shrinkage direction of the cable core 11, reference numeral 30' represents the cable connection portion at an optimized position in the state where the cooling device is operated, and reference numeral 41 represents a wheel. The elements that are not described will be described in detail afterwards.

Figure 2:
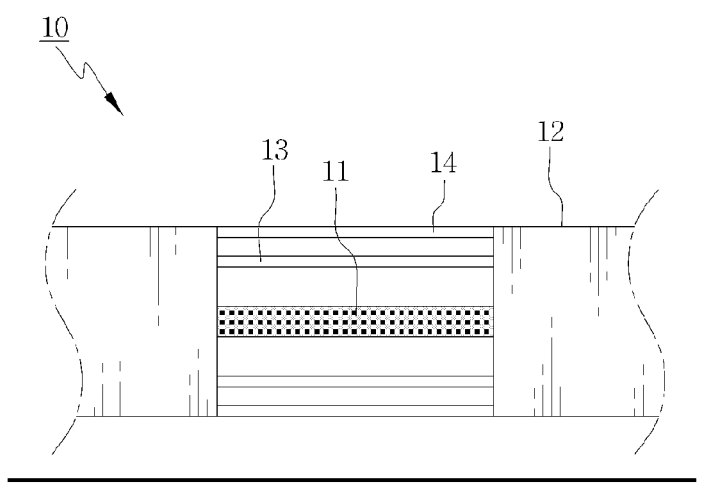
FIG. 2 illustrates a part of a superconducting cable included in the superconducting cable device of FIG. 1.

FIG. 2 illustrates a part of the first superconducting cable 10 according to this embodiment. For the convenience of illustration, in FIG. 2, a part of the length of the first superconducting cable 10 is omitted. In addition, in order to describe the internal structure of the first superconducting cable 10, a part of the first superconducting cable 10 is cut out to be illustrated in FIG. 2.

As illustrated in FIG. 2, the first superconducting cable 10 includes the cable core 11 and the heat-insulating pipe 12 made of a metal that covers the cable core 11. The heat-insulating pipe 12 of the first superconducting cable 10 has a double structure including an inner heat-insulating pipe 13 that covers the cable core 11 and an outer heat-insulating pipe 14 that covers the inner heat-insulating pipe 13 so as to maintain the cable core 11 at a temperature equal to or lower than its critical temperature.

In the inner heat-insulating pipe 13, the coolant 70 flows and cools the cable core 11. For heat insulation of the inner heat-insulating pipe 13, a vacuum state is maintained in a space between the inner heat-insulating pipe 13 and the outer heat-insulating pipe 14.

In FIG. 2, the first superconducting cable 10 is illustrated to include only a single cable core 11. However, this is only for the convenience of illustration, and the first superconducting cable 10 according to this embodiment includes three wires of cable cores 11 (see FIG. 3). The three wires of cable cores 11 are stored in the inner heat-insulating pipe 13 while being twisted.

Since the configuration of the second superconducting cable 20 is substantially the same as that of the first superconducting cable 10 described above, description thereof will be omitted.

Figure 3:
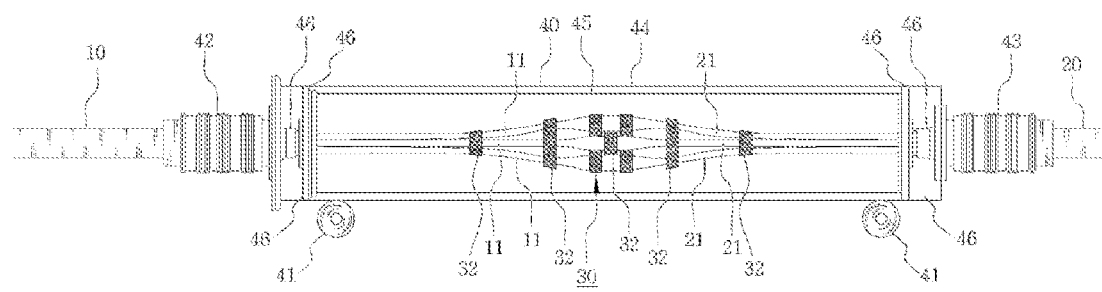
FIG. 3 illustrates the superconducting cables and an intermediate connection box included in the superconducting cable device of FIG. 1.

FIG. 3 illustrates a state where the first and second superconducting cables 10 and 20 are connected to each other by the intermediate connection box 40 in detail.

The intermediate connection box 40 according to this embodiment has a double structure including an outer box 44 and an inner box 45. The coolant 70 that flows from the first superconducting cable 10 flows into the inner box 45 and cools the cable cores 11 and 21 stored in the intermediate connection box 40. A vacuum layer is formed between the outer box 44 and the inner box 45 and thus it is possible to minimize heat invasion of the inside of the intermediate connection box 40.

Spacers and partition walls 46 are installed at both end portions of the intermediate connection box 40 to maintain the vacuum state between the outer box 44 and the inner box 45. According to this embodiment, the spacers and the partition walls 46 are formed of fiber reinforced plastic (FRP) or a material having a thermal conductivity equal to or lower than that of the FRP.

The respective cable cores 11 and 21 of the first and second superconducting cables 10 and 20 extend to the inside of the inner box 45 of the intermediate connection box 40 and are connected to each other.

As shown in FIG. 3, the three strands of cable cores 11 that are twisted inside the heat-insulating pipe of the first superconducting cable 10 are untwisted inside the intermediate connection box 40, and the cable cores 21 of the second superconducting cable 20 are also untwisted inside the intermediate connection box 40.

The corresponding cable cores 11 and 21 which are untwisted are connected to each other one by one and are fixed by soldering. In order to firmly maintain the connected state of the cable cores 11 and 21, the strands of the connected cable cores 11 and 21 are taped to be thick by insulating paper such as polypropylene laminated paper (PPLP). The formed three stands of cable cores are fixed using a plurality of jigs 32. Accordingly, the thick cable connection portion 30 which has a thickness of several times that of the cable core is formed inside the intermediate connection box 40. In this embodiment, the boundary between the cable connection portion 30 and the cable cores 11 and 21 is a portion where the three strands of the cable cores which are connected are initially separated.

Hereinafter, the need to optimize the position of the cable connection portion 30 inside the intermediate connection box 40 will be described.

Figure 4:
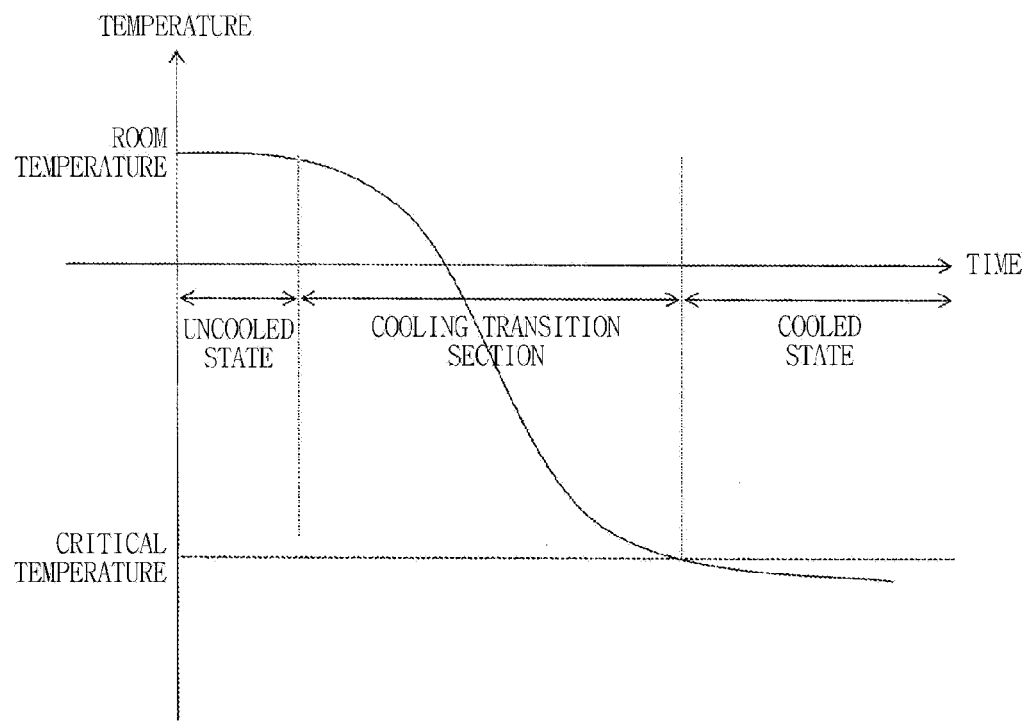
FIG. 4 is a graph showing an "uncooled state" and a "cooled state" of the superconducting cable device.

FIG. 4 is a graph showing an "uncooled state" and a "cooled state" of the superconducting cable device. A state in which the internal temperature of the superconducting cable and the intermediate connection box 40 of the superconducting cable device 1 and the ambient atmospheric temperature are in equilibrium is referred to as the "uncooled state", and a state in which the superconducting cable device 1 is maintained at a temperature equal to or lower than its critical temperature by the coolant is referred to as the "cooled state". A "cooling transition section" may be provided between the uncooled state and the cooled state. This phenomenon may occur when the coolant is caused to flow into the superconducting cable and the intermediate connection box by the cooling device.

Referring to FIG. 3 again, the coolant 70 in the cooled state flows into the intermediate connection box 40 from the first superconducting cable 10. At this time, in a case where the position of the cable connection portion 30 leans to the first superconducting cable 10, that is, in a case where the cable connection portion 30 is disposed to be close to the coolant inlet of the intermediate connection box 40, the coolant 70 which flows into the intermediate connection box 40 at a relatively high speed immediately collides with the cable connection portion 30. Since the cable connection portion 30 has a diameter greater than that of the cable core, a significant eddy occurs as the coolant 70 collides with the cable connection portion 30. Therefore, coolant circulation inside the intermediate connection box 40 cannot be properly performed. For the proper coolant circulation, an additional measure to increase the capacity of the cooling device or the like is needed.

In addition to the mechanical reason described above, for electrical reasons, there is also a need to optimize the position of the cable connection portion 30 inside the intermediate connection box 40.

Figure 5:
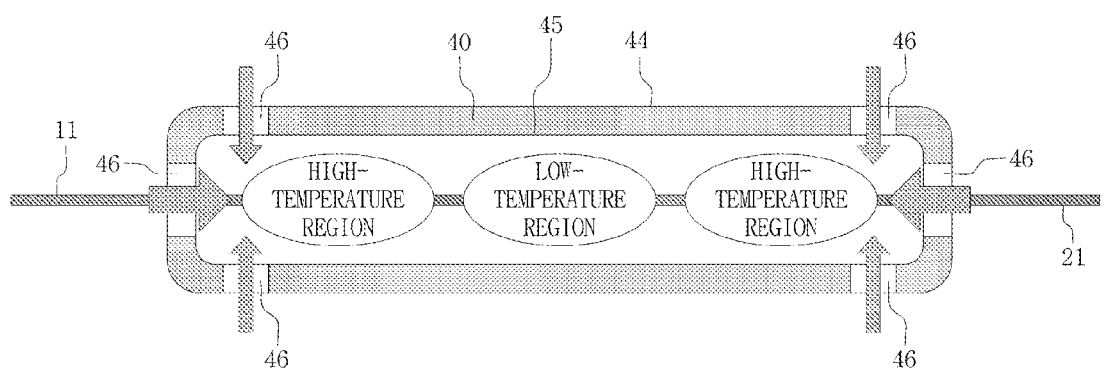
FIG. 5 is a conceptual view showing a temperature distribution inside the intermediate connection box of FIG. 3.

FIG. 5 is a conceptual view showing a temperature distribution inside the intermediate connection box 40 when the intermediate connection box 40 is cooled by the coolant 70.

As described above, the spacers and the partition walls 46 are installed between the inner box 45 and the outer box 44 at both end portions of the intermediate connection box 40. Therefore, as outside heat invasion into the intermediate connection box 40 occurs due to heat conduction through the spacers and the partition walls 46, the temperature of the coolant increases at both end portions of the intermediate connection box 40.

Accordingly, at both end portions of the intermediate connection box 40, a high-temperature region having a relatively higher temperature than that of a center portion is formed, and a low-temperature region is formed in the center portion. That is, in the intermediate connection box 40, there is a temperature deviation for both end portions and the center portion of the connection box.

In this embodiment, a region which has a temperature higher than an average temperature of the coolant 70 inside the intermediate connection box 40 by 5° C. or higher is defined as the high-temperature region. Since the average temperature of the coolant inside the intermediate connection box 40 is about −201° C., the high-temperature region according to this embodiment is a region having a temperature range of equal to or higher than −196° C. (77K), and the low-temperature region is a region other than the high-temperature region and having a temperature lower than that of the high-temperature region.

Typically, the current-carrying capability of a superconducting cable is increased by about 8% as the temperature of the superconducting cable in a superconducting cable device is reduced by 1° C. When the cable connection portion 30 is positioned in the high-temperature region (that is, at both end portions) inside the intermediate connection box 40 while the superconducting cable device 1 is operated, the temperature of the cable connection portion 30 may be increased by about 5° C. or higher than that in the low-temperature region. In other words, when the cable connection portion 30 is positioned in the high-temperature region inside the intermediate connection box 40, the entire current-carrying capability of the superconducting cable device 1 may be reduced by 40% or higher as compared to a case where the cable connection portion 30 is positioned in the low-temperature region. Therefore, the position of the cable connection portion inside the intermediate connection box has a significant effect on the performance of the device.

In addition, the cable connection portion 30 positioned inside the intermediate connection box 40 includes a soldered portion and a jig 32 for connection to the cable core. In the cable core itself made of a superconducting wire, the electrical resistance is close to 0; however, the soldered portion and the jig have resistances. Therefore, when a current is applied to the cable core while the superconducting cable device 1 is operated, the cable connection portion 30 is locally heated due to the resistances of the soldered portion, the jig, and the like. When the cable connection portion 30 that is locally heated is positioned in the high-temperature region inside the intermediate connection box 40, the temperature of the cable connection portion 30 is excessively increased, and in severe cases, there is a danger of breaking the superconducting state.

According to this embodiment, in order to prevent a reduction in efficiency of the superconducting cable device and the danger of breaking the superconducting state, the position of the cable connection portion 30 inside the intermediate connection box 40 is optimized.

Referring to FIG. 1 again, according to this embodiment, the cable connection portion 30 in the uncooled state is disposed to be eccentric from the center line (CL) in the lengthwise direction of the intermediate connection box 40 in a direction in which the coolant 70 flows (to the right from the left in FIG. 1).

When the coolant 70 is injected into the coolant inlet 71 as the cooling device is operated, the cable core 11 of the first superconducting cable 10 is gradually cooled from the coolant inlet 71. Accordingly, the cable core 11 undergoes heat shrinkage in the arrow 31 direction, and a heat shrinkage rate is accumulated as the cable core 11 goes to the intermediate connection box 40. Due to such heat shrinkage of the cable core 11, the position of the cable connection portion 30 is adjusted as it moves to the left inside the intermediate connection box 40.

In this embodiment, in a state where the cable core 11 is completely cooled by the cooling device, the center of the cable connection portion 30 is positioned at the CL in the lengthwise direction of the intermediate connection box 40. Accordingly, the position of the cable connection portion 30 is adjusted to the low-temperature region inside the intermediate connection box 40.

When the cable connection portion 30 is positioned in the low-temperature region inside the intermediate connection box 40 while the device is operated as in this embodiment, there is an advantage that the efficiency of the superconducting cable device 1 is significantly enhanced compared to the case where the cable connection portion 30 is positioned in the high-temperature region of the intermediate connection box 40.

According to this embodiment, in order to position the center of the cable connection portion 30 at the CL in the lengthwise direction of the intermediate connection box 40, an initial position of the cable connection portion 30 which is eccentric from the CL in the lengthwise direction of the intermediate connection box 40 is determined by the heat shrinkage rate of the superconducting wire that forms the cable core 11 of the first superconducting cable 10. According to this embodiment, the initial position of the cable connection portion 30 that is eccentric from the CL in the lengthwise direction of the intermediate connection box 40 is set to 0.2 to 0.5% of the distance from the coolant inlet 71 to the CL in the lengthwise direction of the intermediate connection box 40.

According to this embodiment, the intermediate connection box 40 may include a moving unit so as to adjust the position of the intermediate connection box 40. As illustrated in FIG. 1, the moving unit according to this embodiment is the wheel 41 provided under the lower surface of the intermediate connection box 40. Therefore, by finely adjusting the position of the intermediate connection box 40 in a state where the cable core 11 completely shrinks due to heat shrinkage, it is possible to adjust the position of the cable connection portion 30 with respect to the intermediate connection box 40 to an optimal position.

In the superconducting cable device 1 according to this embodiment, the cable connection portion 30 is positioned in the low-temperature region inside the intermediate connection box 40 while the superconducting cable device 1 is operated. Therefore, it is possible to prevent an increase in the temperature of the cable connection portion 30 because of outside heat invasion other than heat generation due to self resistance.

In addition, it is possible to prevent the cable connection portion 30 from excessively approach the side wall of the intermediate connection box 40 due to heat shrinkage of the superconducting cable, and thus it is possible to prevent an eddy in the intermediate connection box 40. Further, it is possible to prevent the cable connection portion 30 from coming into contact with the inner box 45 of the intermediate connection box 40 and being damaged during the heat shrinkage.

Referring to FIG. 1, the superconducting cable device 1 has two superconducting cables and one intermediate connection box. However, this embodiment is not limited thereto. The superconducting cable device 1 may be lengthened by connection three or more superconducting cables, and intermediate connection boxes may be additionally disposed between the connected superconducting cables.

It will be understood by those skilled in the art that the spirit and scope of this disclosure described above can also be applied to the case where the superconducting cable device 1 is lengthened by using three or more superconducting cables.

Figure 6:
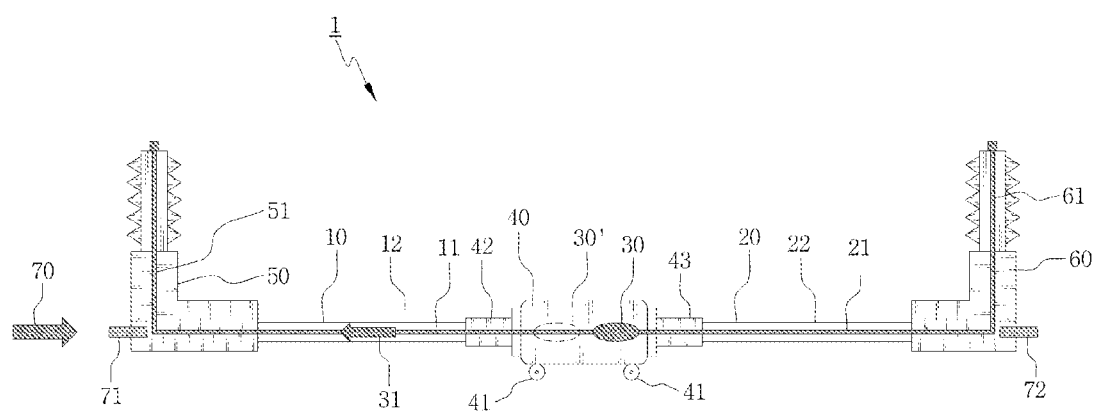
FIG. 6 is a conceptual view of a superconducting cable device according to another embodiment.

FIG. 6 is a conceptual view of the superconducting cable device 1 according to another embodiment.

Except that the length of the intermediate connection box 40 is short, the configurations of this embodiment are the same as those of the above-described embodiment, and therefore detailed description will be omitted.

According to this embodiment, the position of the cable connection portion 30 which is disposed to be eccentric to a right end portion of the intermediate connection box 40 in the uncooled state is adjusted to approach a left end portion of the intermediate connection box 40 in the cooled state by heat shrinkage of the cable core 11. In this configuration, the length of the intermediate connection box 40 may be reduced as compared to the embodiment illustrated in FIG. 1.

The superconducting cable device 1 according to this embodiment has an advantage that it can be easily installed in a small tunnel into which existing power equipment is buried.

According to this disclosure, the position of the cable connection portion inside the intermediate connection box is optimized, and thus it is possible to minimize insulation breakdown of the superconducting cable and damage in the superconducting wire.

In addition, according to this disclosure, it is possible to minimize the overall length of the intermediate connection box as needed.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A superconducting cable device comprising:
    a first superconducting cable and a second superconducting cable;
    an intermediate connection box which connects the first and second superconducting cables to each other; and
    a cooling device which causes a coolant to flow inside the intermediate connection box in a lengthwise direction of the intermediate connection box,
    wherein a cable connection portion for connecting the first and second superconducting cables to each other is provided in the intermediate connection box, and
    the cable connection portion is disposed to be eccentric from a center line in the lengthwise direction of the intermediate connection box in a direction in which the coolant flows, in an uncooled state.

2. The superconducting cable device according to claim 1, wherein, in a cooled state,
    a high-temperature region is formed at both end portions inside the intermediate connection box due to heat that invades the intermediate connection box,
    a low-temperature region which has a temperature lower than that of the high-temperature region is formed at a center portion inside the intermediate connection box, and
    a position of the cable connection portion is adjusted to the low-temperature region inside the intermediate connection box.

3. The superconducting cable device according to claim 2, wherein, in the cooled state, a center of the cable connection portion is positioned at the center line in the lengthwise direction of the intermediate connection box.

4. The superconducting cable device according to claim 3, further comprising:
    a first terminal connection box which is connected to the first superconducting cable; and
    a second terminal connection box which is connected to the second superconducting cable,
    wherein a coolant inlet through which the coolant is injected is provided in the first terminal connection box,
    a coolant outlet through which the coolant flows out is provided in the second terminal connection box, and
    the coolant injected through the coolant inlet flows into the intermediate connection box through the first superconducting cable, and the coolant that flows out from the intermediate connection box passes through the second superconducting cable and flows out through the coolant outlet.

5. The superconducting cable device according to claim 4, wherein a distance by which the cable connection portion is eccentric from the center line in the lengthwise direction of the intermediate connection box in the uncooled state is determined by a heat shrinkage rate of the first superconducting cable.

6. The superconducting cable device according to claim 5, wherein the distance by which the center of the cable connection portion is eccentric from the center line in the lengthwise direction of the intermediate connection box in the uncooled state is 0.2 to 0.5% of a distance from the coolant inlet of the first terminal connection box to the center line in the lengthwise direction of the intermediate connection box.

7. The superconducting cable device according to claim 6, wherein the first and second superconducting cables each include a cable core and a heat-insulating pipe that covers the cable core,
    the heat-insulating pipes of the first and second superconducting cables are respectively connected to both end portions of the intermediate connection box,
    the respective cable cores of the first and second superconducting cables extend to the inside of the intermediate connection box and are connected to each other, and
    the respective heat-insulating pipes of the first and second superconducting cables are joined to the intermediate connection box through expansion joints.

8. The superconducting cable device according to claim 7, wherein the intermediate connection box includes a moving unit so as to enable position adjustment of the intermediate connection box.

* * * * *